Nov. 23, 1954  R. G. BRUGGER  2,695,198
AIR BEARING
Filed July 16, 1947  3 Sheets-Sheet 1

INVENTOR
RICHARD G. BRUGGER
BY
*Herbert Thompson*
his ATTORNEY

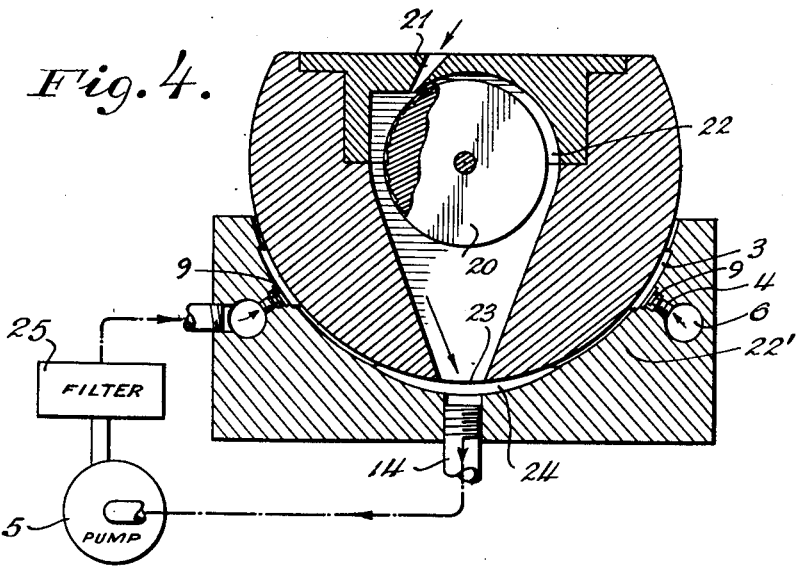
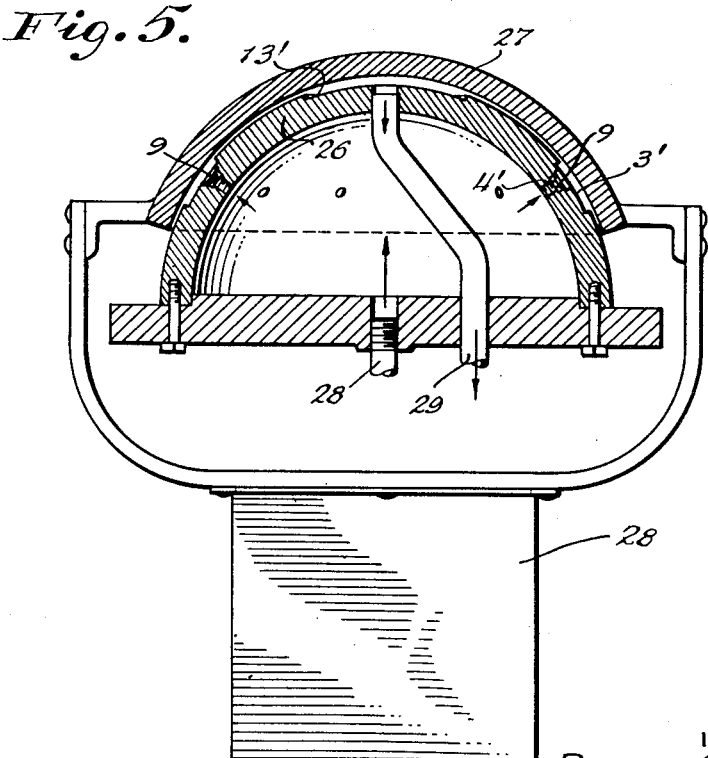

Nov. 23, 1954 R. G. BRUGGER 2,695,198
AIR BEARING
Filed July 16, 1947 3 Sheets-Sheet 3
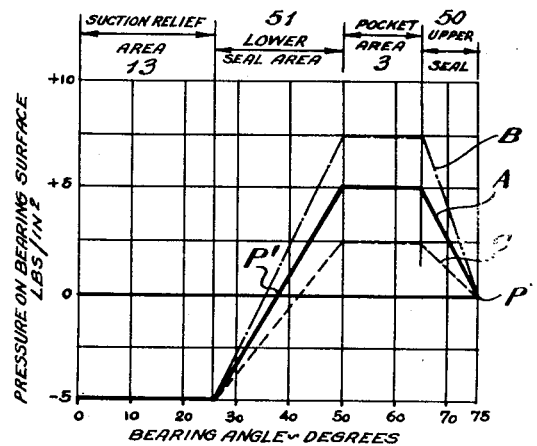
Fig. 9.
Fig. 6.
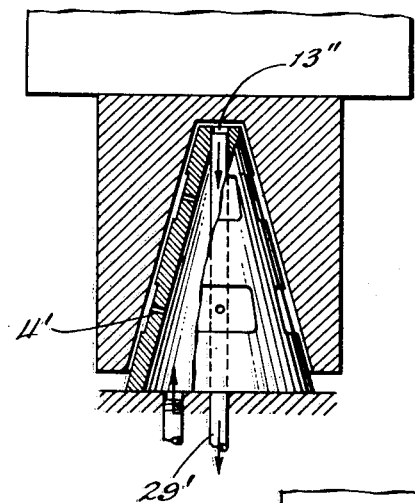
Fig. 7.
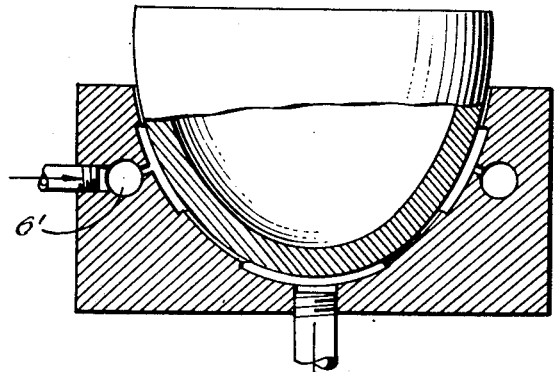
Fig. 8.
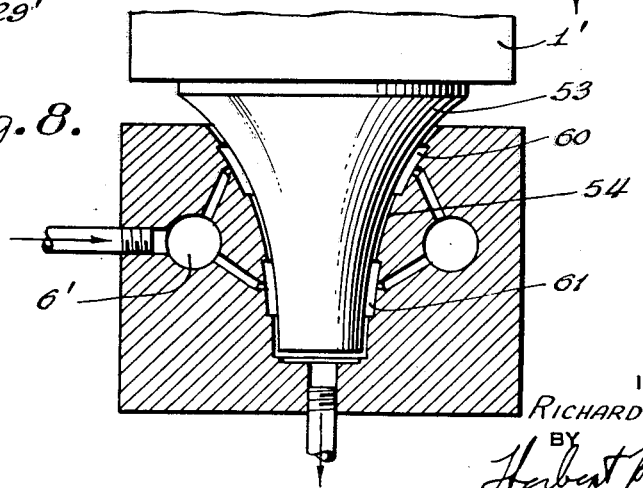
INVENTOR
RICHARD G. BRUGGER
BY
Herbert P. Thompson
his ATTORNEY.

United States Patent Office 2,695,198
Patented Nov. 23, 1954

2,695,198

AIR BEARING

Richard G. Brugger, Hempstead, N. Y., assignor to The Sperry Corporation, a corporation of Delaware Application July 16, 1947, Serial No. 761,281

9 Claims. (Cl. 308—9)

This invention relates to so-called air bearings in which no lubricant or other fluid film between bearing surfaces is employed, other than a film of air or other gas usually created by air flow between closely fitting smooth bearing surfaces of revolution. Such bearings are especially advantageous between surfaces having little relative velocity and reduce friction between such surfaces far below that obtainable with any other type of bearing; provided the relative velocity between the surfaces is kept low. In the past, such bearings have been designed more or less in accordance with the general practice in conventional bearings with closely fitted spherical surfaces between which a film of air is drawn or forced under pressure. Examples of such bearings applied in the art of gyroscopic compasses are shown in the patents to Bolster, No. 2,263,232, dated November 18, 1941, and Braddon, No. 2,295,254, dated September 8, 1942, for Air Borne Gyro Compasses.

Heretofore, however, it has been found necessary to provide at least two spaced bearings to prevent the supported part from being displaced upon the application of sudden acceleration forces, such as may occur in an airplane or a violently rocking ship. In other words, a single spherical bearing at the bottom of the supported sphere could not be used successfully under such circumstances, as the sphere might be bounced out of its cup. Such motions also cause the sphere to contact with its cup because an overload would break down the air film at the point of overload.

It has also been found necessary to provide a plurality of such bearings if it was desired to restrict the freedom to less than three degrees of freedom. Thus both of the above patents show upper and lower spherical cups for these purposes.

A further drawback to such spherical bearings has been that the bearings are not truly self-centralizing so that in case the cup and sphere became relatively tilted or in the presence of a lateral acceleration pressure, the shift in the resultant thrust to one side of the bearing would cause the clearance on that side of the bearing to be markedly reduced and actual contact caused, thus scoring the bearing and losing its freedom.

According to my invention I have overcome the above defects by designing a single air bearing which is self-centralizing, that is, in which any decrease in the thickness of the air film at any point causes an increased pressure to be developed at that point to maintain the air film. For this purpose I employ a plurality of recesses or pockets in the otherwise spherical cup, separated by "seal" bearing areas and supply to each pocket air under pressure less than pump pressure which escapes through the sealing areas at a rate varying with a function of the clearance at the sealing areas. Hence, if conditions arise causing the sphere to approach closer to the cup, the pressure in the pockets rises to oppose such motion, centralizes the sphere and maintains the air film. By this means, the aforesaid dangers of contact are avoided and serious lateral or downward shifting prevented.

In addition, I provide in one bearing, both a pressure zone or zones and a suction zone or zones, the pressure zones supporting the bearing on an air film, and the suction zone preventing any material upward displacement of the supported sphere, thus eliminating the necessity for any upper bearings. This suction pocket arrangement when properly designed coperates with the aforesaid pressure pockets to produce a stable bearing which may be used under all conditions and which will never permit the sphere to bounce out of its cup.

Preferably the aforesaid recessed portions or pockets are symmetrically situated in a zone between the top and bottom of the cup, providing a ring around the supported sphere situated between the bottom pole and the equator, thereby securing not only an upward thrust supporting the weight of the sphere, but a substantial lateral thrust to resist lateral displacement of the sphere in the presence of lateral acceleration forces or tilting of the cup with respect to the sphere. Within each recess, I supply air under pressure, preferably through reducing orifices, so that the pressure within the recess is less, say about half, the supply pressure. Cooperating with the pressure reducing orifices, I additionally provide a baffle which is designed to break up or diffuse the jet of air issuing from the orifices to thereby effectively prevent any torques from being exerted on the sphere containing the sensitive element or elements. The suction zone or pocket we provide in the bottom of the cup has an outlet from which air is withdrawn by a suction pump. Preferably a single recirculating pump with a filter is used to provide both the positive and negative pressure air supplies to save weight and keep dust and foreign matter out of the bearings.

Referring to the drawings in which several forms of my invention are shown,

Fig. 4 is a vertical section showing how the air supply for my bearing may also be used for other purposes within the supported spherical housing, such as for spinning a gyro rotor;

Fig. 5 shows a modified form air bearing in which the cup and sphere are reversed in the roles they play in Figs. 1–4;

Fig. 6 is a vertical section of another form of our improved bearing modified to provide a single degree of freedom only, such as about the vertical axis;

Fig. 7 is a similar view showing another or ellipsoidal form of vertical bearing;

Fig. 8 is a similar view showing a conoidal form of bearing; and

Fig. 9 is a diagram showing the distribution of pressure over the surface of the cup and sphere of Fig. 1 under different conditions of loading or load distribution.

Figure 1:
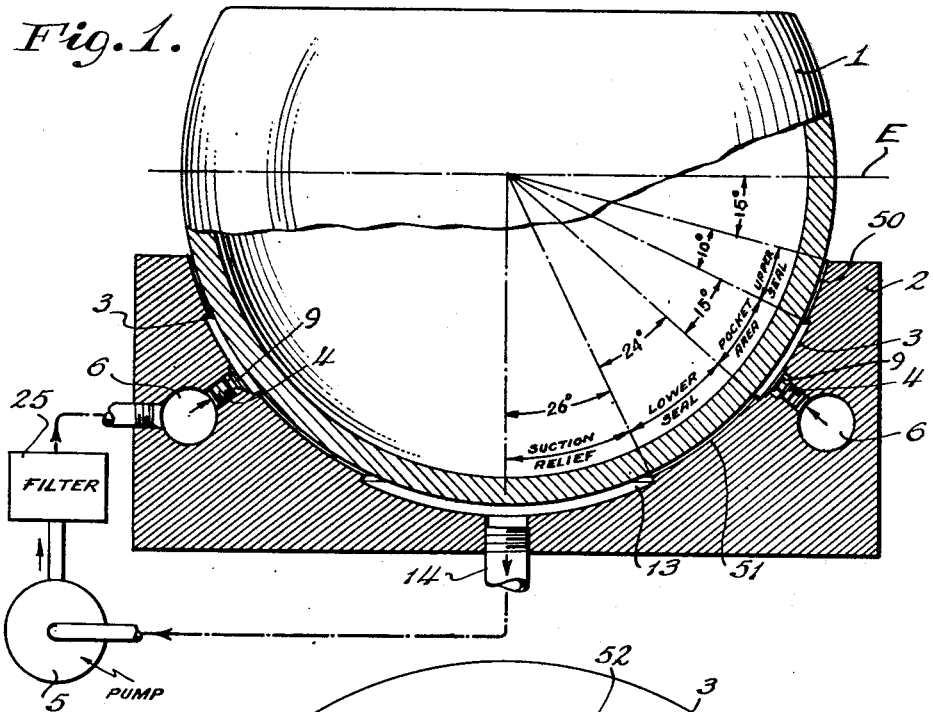
Fig. 1 is a vertical section through my improved air bearing here shown as spherical in form.
Figure 2:
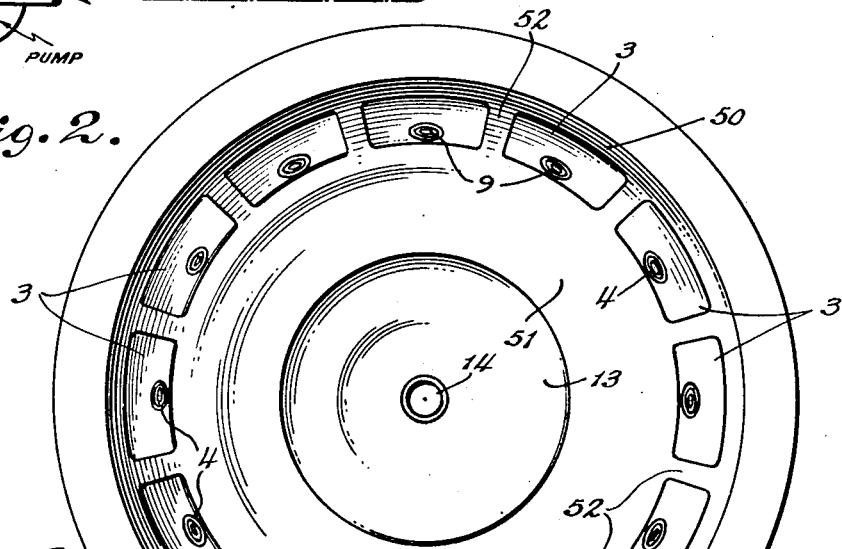
Fig. 2 is a plane view of the cup or bowl-shaped part of the bearing.

In Figs. 1 and 2 the supported or sensitive element 1 is shown as a hollow sphere floated with three degrees of freedom on an air bearing provided by the cup-shaped support 2. The sphere 1 may contain any sensitive device desired, such as one or more gyroscopes, a magnetic needle or a combination of the two, but since the invention is not directed to the supported elements, none are shown in Fig. 1. At least one of the complementary supported surfaces, preferably the supporting cup 2, is provided with a plurality of symmetrically placed shallow pockets or slight recesses 3 distributed around a latitude circle in the cup and separated from the upper edge and bottom pole of the cup by annular zones or seals 50 and 51 and from each other by radial seals 52 which seal areas form air bearing surfaces for the sphere. This circle or "parallel" of pockets preferably is at a substantial angle from both the equator E of the sphere and cup and the bottom pole, the exact angle being determined by the comparative amount of lateral and vertical support desired. Angles between 15 degrees to 60 degrees below the equator have been used with success, the angle to the upper edge of the pockets being shown in Fig. 1 as 25 degrees. While the equatorial line E of the cup and sphere may coincide if the cup is less than a hollow hemisphere, the equator of the cup will be slightly above that of the sphere if the radius of the sphere is made less than that of the cup by the normal air film thickness, when no air is supplied, the equators being coplanar when the air film is interposed.

An orifice 4 is provided leading into each recess from a source of pressure, such as in air pump 5. As shown the output of the pump is connected to a circular passage 6 around the interior of the cup, which is connected through orifices 4 to each recess.

Figure 3:
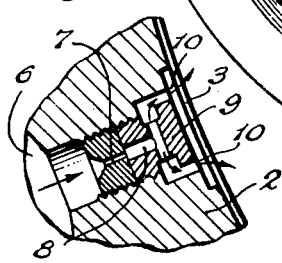
Fig. 3 is an enlarged sectional detail of one of the orifices through which the pressure of air is supplied at normally reduced pressure.

Each orifice is especially designed, not only to reduce the pump pressure, but to cause a minimum of turbulence and velocity in the air emerging against the sphere, and additionally to prevent the jet of air issuing from each orifice from impinging directly on the surface of sphere to thereby prevent any torques being exerted thereon. One design for this purpose is shown in Fig. 3. The air from channel 6 passes into a small bore passage 7, thereby reducing the pressure and imparting a fairly high velocity to the air. The velocity is then reduced in passing through a larger passage 8 and laterally around a baffle member 9 and then outwardly into the recess 3 through an annular channel 10. Alternatively a fine mesh screen or porous material may be used to distribute the air and reduce turbulence and velocity.

After entering the pockets the air passes in both directions between the sphere and the cup through annular seals having a clearance on the order of .002 of an inch or less between the cup and sphere. The part of the air escaping upwardly through seal 50 escapes directly into the atmosphere at the top of the cup and the part flowing downwardly across the annular reduced clearance portion or seal 51 escapes into a much larger recess 13 at the bottom of the cup which may be a single annular pocket of greater area than any of the recesses 3. From the bottom of this recess air is continuously extracted through the pipe 14 preferably leading into the intake of the pump 5. Suction is therefore created over this area holding the sphere in the cup against any sudden upward acceleration pressures.

The recesses 3 are designed, as indicated above, so as to be self-centralizing in the sense that the pressure exerted against the sphere is increased in the event the clearance at that point is decreased. This is accomplished primarily by restricting the air flow from the pump by the restricted passages or orifices 7, so that the air pressure under normal conditions within the depressions 3 is considerably less than, such as on the order of one-half, the pump pressure, as indicated in the full line curve A of Fig. 9. If then, the pressure of the sphere against any one or a group of pockets 3 is increased, such as by an increased downward pressure or lateral pressure at that point, the clearance for the escape of the air through the restricted annular seals 50, 51 is reduced causing a rise of the pressure in the affected recess or recesses (see curve B). Conversely, a decrease in pressure will cause an increase in the thickness of the air film, as shown in curve C. Similarly for a lateral displacement of the sphere in the cup, the clearance will increase over some pockets and decrease over the others resulting in a rapid pressure build-up over the decreased clearance areas and a pressure decrease over the increased clearance areas. The large differential pressure over the areas affected, immediately counteracts the lateral load and prevents the sphere from contacting the cup. Removal of any of these loads results in an immediate and precise relocation of the sphere to the position it had with respect to the cup prior to the application of the load.

The amount of shift of the sphere per thousandths of an inch under a unit change in load, we term the "bearing rate." If a 100 lb. increase of load on the bearing produces a change in the air film of half a thousandth of an inch, measured along the vertical axis of the bearing, the rate of the bearing is said to be 200. Of course, this rate only holds true within limits, since when the pressure within the pockets approaches that of the pump pressure, the maximum load is being approached. The pressure and supporting areas, of course, are so chosen that this maximum load is never reached under operating conditions, as otherwise contact would be made between the bearing surfaces.

Both the pressure pockets and suction pockets cooperate with the sealing areas in producing the above-described, important self-centralizing effect, which may be seen from the following analysis. The effective pressure area around each recess is not only the area of the pocket itself, but extends a limited distance in all directions. Upwardly it extends close to the upper edge of the cup in a decreasing amount; as indicated by the intersection of line A with the zero abscissa at point P on the right side of Fig. 9. Downwardly it extends to a point P' between the recess 3 and the recess 13. This point P' shifts downwardly upon decrease in the thickness of the air film because the air pressure in the recess 3 rises while the negative pressure in the recess 13 remains substantially constant. Therefore, both an increased supporting area and a higher mean effective pressure are provided. This is represented by the comparative areas under curves A, B and C in Fig. 9. It may be noted, however, that the areas between the curves A, B and C above and below the zero line do not represent the total positive and negative pressure on the supported part, since the abscissas are in angles or degrees and not spherical area in square inches, as will be apparent from Fig. 1. Thus, while the angle between the vertical and the upper edge of the suction pocket 12 is 26 degrees as compared to an angular distance of only 24 degrees for the lower seal and 10 degrees for the upper sealed area, the effective total area of the suction pocket is much less than the sum of the other two areas as will be apparent by comparing the relative areas of supporting annular seals 51 and 50 with the area of pocket 13 in Fig. 2.

The "rate" of the bearing may also be increased by so designing the restriction 7 with respect to the manifold and pocket pressures that the velocity of air flow through the restriction approaches the velocity of sound. Such conditions are reached when the ratio of the pocket pressure to the manifold pressure is about $53/100$ under normal operating conditions, such pressure being known as the "critical pressure." If then the bearing clearance is increased, the pocket pressure will fall without a corresponding increase in the air flow into the pocket. Hence the restoring force for increasing unit displacement, or, in other words, "the rate of the bearing" will be greater than that otherwise obtained.

It will of course be understood that the figures given for the angles and pressures in Figs. 1 and 9 are given by way of example only, and that such figures may be varied widely within the scope of my invention.

My improved bearing readily lends itself to the supplying of air for other purposes within the supported sphere without any flexible connections or sealed joints. Thus in Fig. 4, I have shown how my bearing may be readily adapted to furnishing an air supply for spinning a gyro rotor, represented diagrammatically at 20, by means of an air jet. The air jet 21 is shown as supplied with air at atmospheric pressure, air being drawn into the interior of the spherical casing 22 surrounding the rotor through jet 21 and thence downwardly through an aperture 23 in the bottom of the sphere leading within the recessed portion 24 at the bottom of the cup 22'. The pump is provided with a sufficient suction not only to draw air through the sphere in this manner, but also to create the necessary suction between the sphere and cup to prevent upward displacement. Preferably an air filter 25 is placed in the recirculating air system to remove dust and the like which is likely to affect the operation of the bearing.

An inverted type of spherical bearing is shown in Fig. 5. In this form the supporting surface 26 is in the form of a dome or hollow sphere, while the supported member 27 is in the form of a cup resting on the top of the spherical surface. The instrument to be supported, is represented as enclosed in a box 28 suspended from the cup 27. It will be understood, of course, that the supporting element in all figures may be gimbaled if desired, by the usual gimbal supports as shown in the aforesaid patents to Bolster and Braddon.

In Fig. 5 the suction recess 13' is shown as on top of the supporting sphere, while the recesses 3' are symmetrically placed around a parallel about 30 degrees above the equator. To supply the orifices 4' with air under pressure, air is shown as introduced into the hollow spherical support through a pipe 28 leading to a pump (not shown). Air is extracted from the suction recess 13' through a second pipe 29.

My invention is, of course, not limited to a spherical type of bearing, but other types may be adopted especially where freedom is desired only about one axis, such as a vertical axis. Such a bearing may be of a general conical shape as shown in Fig. 6 or may be egg-shaped as shown in Fig. 7 and may be of the ordinary or inverted type in either case. The top suction area 13" in Fig. 6 is shown as the same area as that of the exhaust pipe 29' as it is obvious that the pipe may be as large as this area if desired.

In Fig. 8 the surfaces of revolution are shown in the form of truncated conoids 53, 54 with two axially spaced groups of pressure pockets as is also the case in Fig. 6. In Fig. 8, however, the upper group of pockets 60 will support the main downward thrust of the sensitive element 1' while the lower group of pockets 61 will act mainly as guide bearings in conjunction with the spaced pockets 60.

It will also be understood that if desired or for special cases, the symmetrically placed pressure pockets may be provided without the suction pocket, or such pockets may be used for horizontal air bearings. However, by the combination of my "push-pull" air bearing combination a unitary improved result is secured far beyond that obtainable with either system used alone in a single bearing.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

Thus while my invention is shown as applied to vertical bearings, it obviously is adapted for horizontal or inclined bearings as well, the conical shapes being well adapted for this purpose.

Because of diversity in inventorship, the suction pocket feature and its combination with the pressure pockets is not claimed herein but in a separate application in the name of Robert Blizzard, Serial No. 782,358, filed October 27, 1947, and assigned to the same assignee as the present application.

What is claimed is:

1. A self-centering air bearing for sensitive instruments, comprising a cup having a plurality of pockets in the interior surface thereof symmetrically arranged about the vertical axis thereof in a zone between the top or equator and the bottom of the cup, said cup interfitting with a convex surface on the instrument, a source of air pressure for supplying air under pressure within each pocket and a pressure reducing device between each pocket and such source, whereby an increased bearing load at a pocket in decreasing the thickness of the supporting air film surrounding the pocket thereby causes increase in the pressure within the pocket.

2. A self-centering air bearing for sensitive instruments, comprising a spherical convex surface having a plurality of pockets in the exterior surface thereof symmetrically arranged about the vertical axis thereof in a zone between a pole and the equator of the surface, said surface interfitting with a concave surface on the instrument, a source of air pressure for supplying air under pressure within each pocket, and a pressure reducing device between each pocket and such source, whereby an increased bearing load at a pocket in decreasing the thickness of the supporting air film surrounding the pocket thereby causes increase in the pressure within and adjacent the pocket.

3. A self-centering air bearing for sensitive instruments, comprising a hollow conoidal surface having a plurality of pockets in the interior surface thereof symmetrically arranged about the vertical axis thereof in a plurality of vertically spaced zones between the top or equator and the bottom of the cup, said cup interfitting with a conoid surface on the instrument, a source of air pressure for supplying air under pressure within each pocket and a pressure reducing device between each pocket and such source, whereby an increased bearing load at a pocket in decreasing the thickness of the supporting air film surrounding the pocket thereby causes increase in the pressure within the pocket.

4. A self-centering air bearing for sensitive instruments, comprising a hollow cone having a plurality of pockets in the exterior surface thereof symmetrically arranged about the vertical axis thereof in a plurality of zones between a pole and the equator of the surface, said surface interfitting with a conical cavity on the instrument, a source of air pressure for supplying air under pressure within each pocket, and a pressure reducing device between each pocket and such source, whereby an increased bearing load at a pocket in decreasing the thickness of the supporting air film surrounding the pocket thereby causes increase in the pressure within and adjacent the pocket.

5. An air bearing as claimed in claim 1 wherein the supporting areas of said pockets face in directions having both vertical and centralizing components whereby the supported instrument is air borne against both vertical and lateral pressures.

6. An air bearing for freely supporting a sensitive instrument for movement about all of its axes including complementary, interfitting surfaces of revolution on the supported sensitive instrument and on the supporting member therefor normally separated by a film of flowing air, spaced pockets in the said surface of the supporting member, means for supplying air under pressure to each of said pockets, and a baffle in each pocket for preventing the supplied air from impinging in a jet against the surface of said supported instrument whereby the air supplied to said pockets will support said instrument for free rotation without imparting torques thereto.

7. An air bearing for freely supporting a sensitive instrument for movement about all of its axes including complementary, interfitting surfaces of revolution on the supported sensitive instrument and on the supporting member therefor normally separated by a film of flowing air, spaced pockets in the said surface of the supporting member, a source of air pressure for supplying air under pressure within each pocket, a pressure reducing device between each pocket and said source, and baffle means on the supporting member between said pressure reducing device and the surface of said instrument for preventing the supplied air from impinging in a jet against the surface of said supported member.

8. An air bearing for sensitive instruments comprising a cup having a plurality of pockets in the interior surface thereof, symmetrically arranged about the vertical axis of said cup and in a zone between the top and the bottom thereof, said cup interfitting with a convex surface on the instrument, a source of air pressure for supplying air under pressure within each pocket, a pressure reducing device between each pocket and said source, and a baffle within each pocket and between the surface of said instrument and said pressure reducing device for eliminating direct impingement of the supplied air in a jet against the convex surface on the instrument, whereby no torques will be exerted on said instrument due to the air issuing from said pressure reducing device.

9. In an air bearing for freely supporting a sensitive instrument including complementary, interfitting surfaces of revolution on the supported sensitive instrument and on the supporting member, spaced pockets in the said surface of the supporting member, means for supplying air under pressure within said pockets, a pressure reducing orifice, and a baffle within each of said pockets and between said orifice and the surface of said instrument, said baffle preventing the supplied air issuing from said orifices from directly impinging against the surface of said supported member, whereby the air supplied to said pockets will support said instrument for free rotation without imparting torques thereto.

References Cited in the file of this patent

UNITED STATES PATENTS

| Number | Name | Date |
|---|---|---|
| 816,330 | Johnston | Mar. 27, 1906 |
| 1,629,577 | Klahn | May 24, 1927 |
| 2,049,343 | Warren | July 28, 1936 |
| 2,295,254 | Braddon | Sept. 8, 1942 |

FOREIGN PATENTS

| Number | Country | Date |
|---|---|---|
| 186,595 | Great Britain | May 17, 1923 |